Wayne & Miller,

Folding Table,

No. 1,855. Reissued Jan. 24, 1865.

Witnesses.
James H. Layman.
Jno. H. Woodward

Inventors.
J. W. Wayne
J. R. Miller
per Knight Bros. attys.

N. PETERS, PHOTO-LITHOGRAPHER, WASHINGTON, D. C.

UNITED STATES PATENT OFFICE.

JOSEPH W. WAYNE AND JOSEPH R. MILLER, OF CINCINNATI, OHIO.

IMPROVED FOLDING TABLE.

Specification forming part of Letters Patent No. 43,538, dated July 12, 1864; Reissue No. 1,855, dated January 24, 1865.

*To all whom it may concern:*

Be it known that we, JOSEPH W. WAYNE and JOSEPH R. MILLER, both of Cincinnati, Hamilton county, Ohio, have invented a new and useful Portable Table; and we do hereby declare the following to be a full, clear, and exact description thereof, reference being had to the accompanying drawings, making part of this specification.

Our invention relates to a table of peculiar construction, adapted, when not in use, to be compactly folded together for the purpose of transportation or of storage.

A represents a table-top. B B′ are two legs hinged to the under side of the table-top and pivoted at or near their mid-length to two other and similar legs, D D′, whose upper extremities, *d d′*, are wholly disconnected from the top, except in the standing condition of the table, when they occupy sockets *a a′* in the under side of the top. The legs D D′ are secured in the sockets *a a′* by means of catches E E′, or any equivalent device, such as buttons or pins. Sockets F F′ may be provided in the sides of the legs D D′ to receive the said catches.

Figure 2:
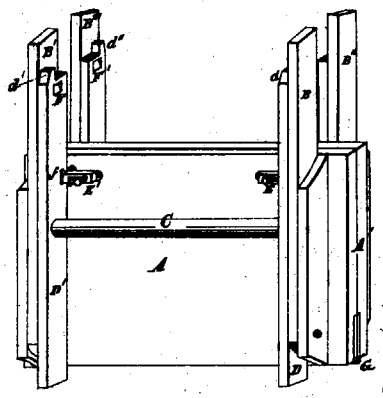
Figure 1:
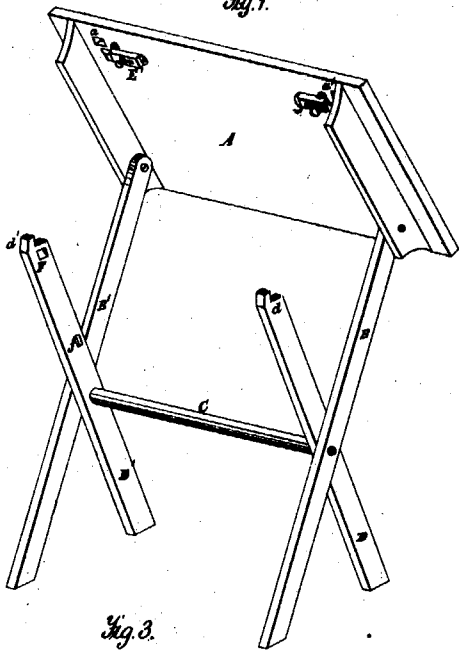

In folding the table the catches E E′ are disengaged and the four legs are closed back compactly against the under side of the top, as shown in Figure 2.

A large number of tables thus folded may be stacked one upon another and secured in a bundle by means of cleats, much in the same manner as wash-boards are, and in this form may be shipped or carted to great distances without injury or the danger of misplacing parts, and on arrival at their destination may be made instantly available. Sockets *f* in the legs D D′, receiving the catches E E′, may serve to hold the table to its closed condition.

Figure 3:
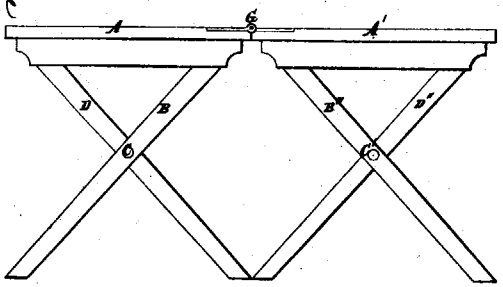

Figs. 2 and 3 represent a duplicate form of our improvement, made by bringing two tops together, Fig. 2 representing the same as folded, and Fig. 3 as extended for use.

We are aware that tables have been constructed supported on folding and intersecting legs, and we therefore make no claim thereto apart from our specific contrivance; but

What we claim herein as new and of our invention is—

The folding table, having one pair of legs, B B′, hinged to the top A, and another pair of legs, D D′, pivoted to and intersecting with the first pair, the upper ends of the legs D D′ being, in the standing condition of the table, secured to the top by sockets *a a′* and catches E E′, or their equivalents, and being wholly disconnected from the top for folding, as herein explained.

In testimony of which invention we hereunto set our hands.

JOSEPH W. WAYNE.
JOSEPH R. MILLER.

Witnesses:
GEO. H. KNIGHT,
JAMES H. LAYMAN.